(12) United States Patent
Koda

(10) Patent No.: US 7,001,172 B2
(45) Date of Patent: Feb. 21, 2006

(54) CLAMPING DEVICE FOR INJECTION BLOW OR INJECTION STRETCH BLOW MOLDING MACHINE

(75) Inventor: Hideaki Koda, Nagano-ken (JP)

(73) Assignee: A.K. Technical Laboratory, Inc., Nagano-ken (JP)

( * ) Notice: Subject to any disclaimer, the term of this patent is extended or adjusted under 35 U.S.C. 154(b) by 298 days.

(21) Appl. No.: 10/674,804

(22) Filed: Sep. 29, 2003

(65) Prior Publication Data

US 2004/0105912 A1   Jun. 3, 2004

(30) Foreign Application Priority Data

Sep. 30, 2002   (JP) .............................. 2002-287154

(51) Int. Cl.
    *B29C 49/06*   (2006.01)
(52) U.S. Cl. ...................... 425/533; 425/534; 425/577; 425/589
(58) Field of Classification Search ................ 425/533, 425/534, 541, 577, 589, 450.1
    See application file for complete search history.

(56) References Cited

U.S. PATENT DOCUMENTS

| | | | | |
|---|---|---|---|---|
| 4,457,689 A | * | 7/1984 | Aoki | ........................... 425/533 |
| 4,731,011 A | * | 3/1988 | Nakamura et al. | ........... 425/533 |
| 5,062,787 A | * | 11/1991 | Takeuchi | ..................... 425/533 |
| 5,080,574 A | * | 1/1992 | Koga et al. | .................. 425/533 |
| 5,403,177 A | * | 4/1995 | Priest | .......................... 425/533 |
| 5,424,022 A | * | 6/1995 | Koga | .......................... 425/533 |
| 6,394,787 B1 | * | 5/2002 | Kobayashi | .................. 425/595 |

* cited by examiner

Primary Examiner—James P. Mackey
(74) Attorney, Agent, or Firm—Weingarten, Schurgin, Gagnebin & Lebovici LLP

(57) ABSTRACT

The mold opening speed is increase by upward moving a movable plate of a vertical clamping device for an injection blow molding machine by hydraulic cylinders at the both sides instead of a booster ram.

The following are used: a lower base plate with an injection cavity mold set on its upper surface, a cylinder block for clamping connected to upper ends of tie bars vertically disposed at both sides of the lower base plate, an upper base plate vertically movably set above the lower base plate guided by the tie bars to rotatably hold a turntable of a neck mold below the upper base plate, a movable plate vertically movably set on the upper base plate guided by the tie bars and connected with a clamping ram at the center of the upper surface, and an injection core inserted into a cavity of an injection cavity mold through the upper base plate, turntable, and neck mold and attached to the under face of the movable plate. An upper base plate vertically moving cylinder and a movable plate upward moving cylinder are set to both ends of the lower base plate and movable plate so as to be vertically faced each other and both piston rods are longitudinally connected to the upper base plate.

1 Claim, 3 Drawing Sheets

CLAMPING DEVICE FOR INJECTION BLOW OR INJECTION STRETCH BLOW MOLDING MACHINE

BACKGROUND OF THE INVENTION

1. Field of the Invention

The present invention relates to a clamping device for an injection blow molding machine capable of injecting a preform and blowing or stretch blow molding a hollow molded article such as a bottle in the same machine.

2. Detailed Description of the Prior Art

In the case of a vertical clamping device for a conventional injection blow molding machine, a clamping ram installing a booster ram is connected to a movable plate to which an injection core is set, so that the movable plate can be vertically moved and clamped by the claming ram. (Refer to the U.S. Pat. No. 5,062,787.)

In the case of the above prior art, the booster ram is set in the hollow clamping ram positioned below the upper portion of a clamping cylinder and, by the booster ram, the clamping ram is contracted in the clamping cylinder to move upward the movable plate connected to the lower end of the clamping ram. A clamping board and a plurality of injection cores fixed to the clamping board downward are mounted on the under face of the movable plate.

In the case of the above prior art, even if the movable plate is guided and held by the tie bars, all of the load of the movable plate is applied to the clamping ram, so the booster ram moves upward along the clamping ram against the load. Therefore, burden of the booster ram increases and, for reducing the burden, it opens a mold together with an upper base plate for a while. Consequently, the function of the booster ram normally used for opening and closing is not sufficiently shown. Moreover, because the booster ram supplies pressurized oil to the clamping ram through a thin flow passage bored in the ram, a problem occurs that oil-pressure resistance increases and it is difficult to open the mold at a high speed.

SUMMARY OF THE INVENTION

The present invention is made to solve the aforementioned conventional problem and its object is to provide a clamping device for a new injection blow molding or injection stretch blow molding machine making it possible to increase the mold opening speed of a movable plate having a load by adopting a hydraulic cylinder whose only one side is hydraulically operated as an upward moving cylinder for the movable plate instead of a booster ram.

The present invention for achieving the above object comprises a lower base plate with an injection cavity mold set on its upper surface, a cylinder block for clamping connected to upper ends of tie bars stood on both sides of the lower base plate, an upper base plate vertically movably set above the lower base plate guided by the tie bars to rotatably hold a turntable of a neck mold below the upper base plate, a movable plate vertically movably set on the upper base plate guided by the tie bars and connected with a clamping ram at the center of the upper surface, and an injection core inserted into a cavity of the injection cavity mold through the upper base plate, the turntable, and the neck mold and attached to the under face of the movable plate, wherein an upper-base-plate vertically-moving cylinder and a movable plate upward moving cylinder are disposed at both ends of the lower base plate and movable plate so as to be vertically faced each other and both piston rods are connected to the upper base plate.

In the case of the above configuration, the movable plate can be moved upward by the upward moving cylinders at both ends set to the upper base plate and the movable plate instead of the booster ram set into the clamping cylinder and the clamping ram. Therefore, the ascending speed (mold opening speed) is not lowered due to the load of the movable plate side and the oil-pressure resistance of the booster ram is reduced. Thus, the following advantages are obtained: the movable plate can be move upward more quickly, and open and closing the mold can be performed for either of the upper base plate or the movable plate at first or both of them at the same time in accordance with the operation sequence of the upper and lower vertically moving cylinders and moreover, the structure of the clamping cylinder is simplified.

DETAILED DESCRIPTION OF THE PREFERRED EMBODIMENTS

Figure 1:
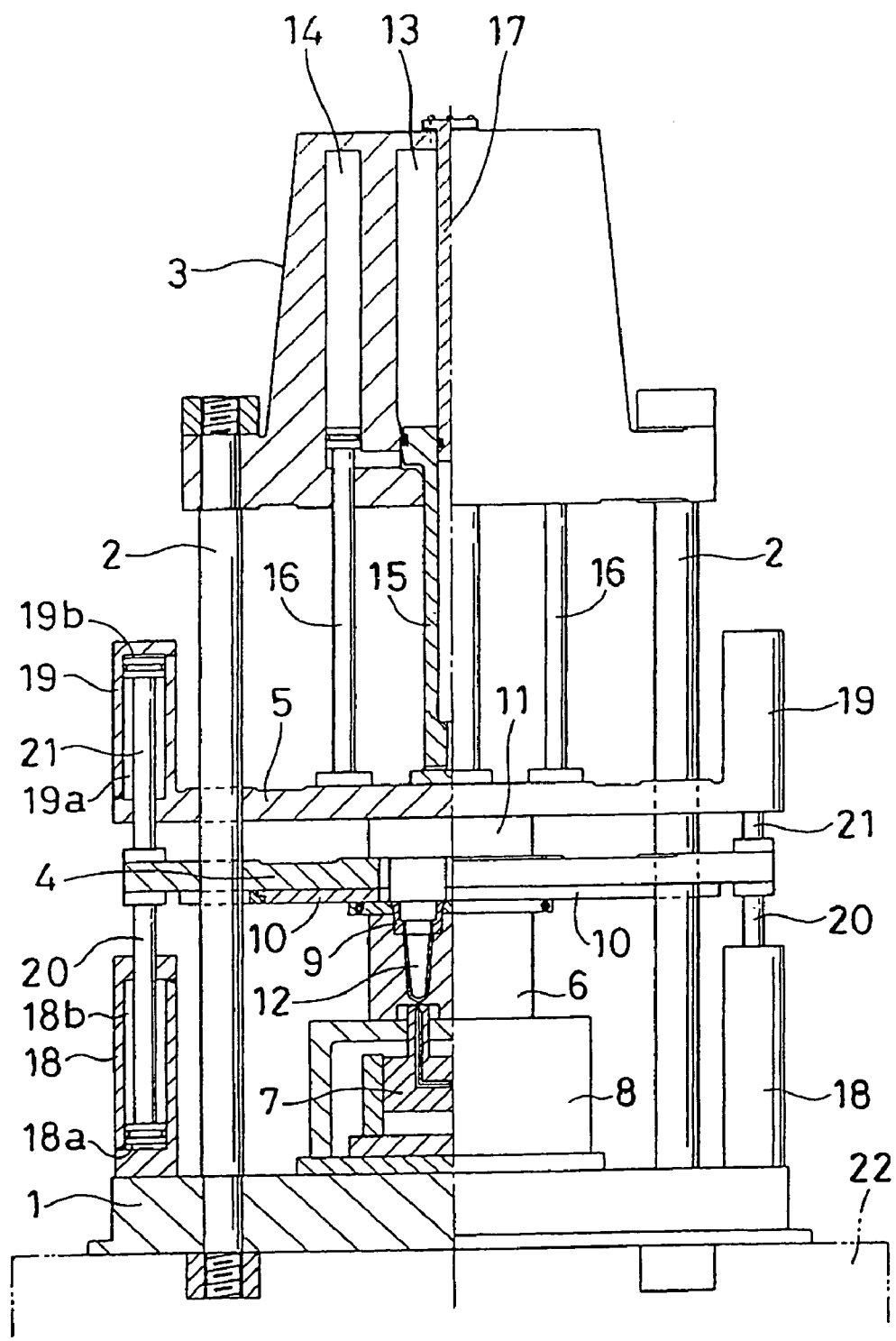
FIG. 1 is a left half vertical sectional view in elevation, of a clamping device of the present invention at the time of closing a mold.

In the accompanying drawings, reference numeral 1 designates a lower base plate in which a cylinder block for clamping 3 is connected to upper ends of a pair of tie bars 2 stood up on the both sides of the lower base plate. Reference numeral 4 designates an upper base plate set above the lower base plate 1 by keeping a working space, 5 designates a movable plate disposed between the cylinder block for clamping 2 and the upper base plate 4 and both the upper base plate 4 and the movable plate 5 are vertically and movably set by being guided by the tie bars 2.

An injection cavity mold 6 having a cavity 6a whose upper portion opens is set on the upper surface of the lower base plate 1 by putting the injection cavity mold 6 on a pedestal 8 in which a hot runner block 7 is provided and a neck mold 9 for closing a mold with the injection cavity mold 6 is set on the under face of a turntable 10 rotatably held at the under face of the upper base plate 4. Moreover, a clamping plate 11 is mounted to the center of the under face of the movable plate 5 and an injection core 12 to be inserted into the cavity 6a of the injection cavity mold 6 is mounted to the clamping plate 11 so as to be long downward through a hole portion bored on the upper base plate 4, the movable plate 5 and a neck mold 8.

The cylinder block for clamping 3 includes a longitudinal clamping cylinder 13 in the center and a pair of pressurized-oil charge cylinders 14 at the both sides of the longitudinal clamping cylinder 13 and a clamping ram 15 and a charge rod 16, integrated with pistons sliding in each cylinders, are respectively connected to the upper surface of the movable plate 4. Moreover, the clamping ram 15 is hollow, and a guide rod 17 longitudinally set to the center of the clamping cylinder 13 is inserted into the clamping ram 15. The sectional area of the clamping cylinder 13 is restricted to the one corresponding to sectional areas of the pair of charge cylinders 14, so that pressurized oil can be properly charged. Furthermore, it is not shown in the figure, however, upper and lower chambers of the clamping cylinder 13 are communicated each other by a bypass provided with an on-off valve.

A vertically moving cylinder 18 having upper and lower chambers 18a and 18b, and an upward moving cylinder 19 in which a lower chamber serves as an empty chamber 19a and an upper chamber 19b serves as an oil chamber are longitudinally disposed at the same position so as to be vertically faced each other at the both ends of the lower base plate 1 and the movable plate 5 outside of the tie bars 2. The upper base plate 4 and the movable plate 5 can be simultaneously or individually moved up stepwise by connecting each of piston rod 20 and 21, which are integrated with the pistons sliding in the cylinders, to the both ends of the upper base plate 4 so as to vertically hold the rods 20 and 21. In the accompanying drawings, reference numeral 22 designates a machine bed and 23 a bottomed preform.

In the clamping state shown in FIG. 1, a preform 23 formed by a resin injected and filled into the cavity from the hot runner is cooled by the injection cavity mold 6 installing a cooling passage and the injection core 12 up to a state in which the preform shape is kept. When the pressurized oil is supplied to the lower chamber 18a of the vertically moving cylinder 18 after the injection and cooling, the piston rod 20 extends while discharging the pressurized oil from the upper chamber 18b to move upward the upper base plate 4.

In this case, because the movable plate 5 also contacts with the upper base plate 4 through the clamping plate 11, it moves up together with the upper base plate 4 while contracting the claming ram 15. Since most of the pressurized oil in the upper chamber of the clamping cylinder 13 flows to the lower chamber from a clearance around the piston shown in FIG. 2, a negative pressure is prevented and extra pressurized oil is pumped up and stored in the charge cylinder 14.

Figure 2:
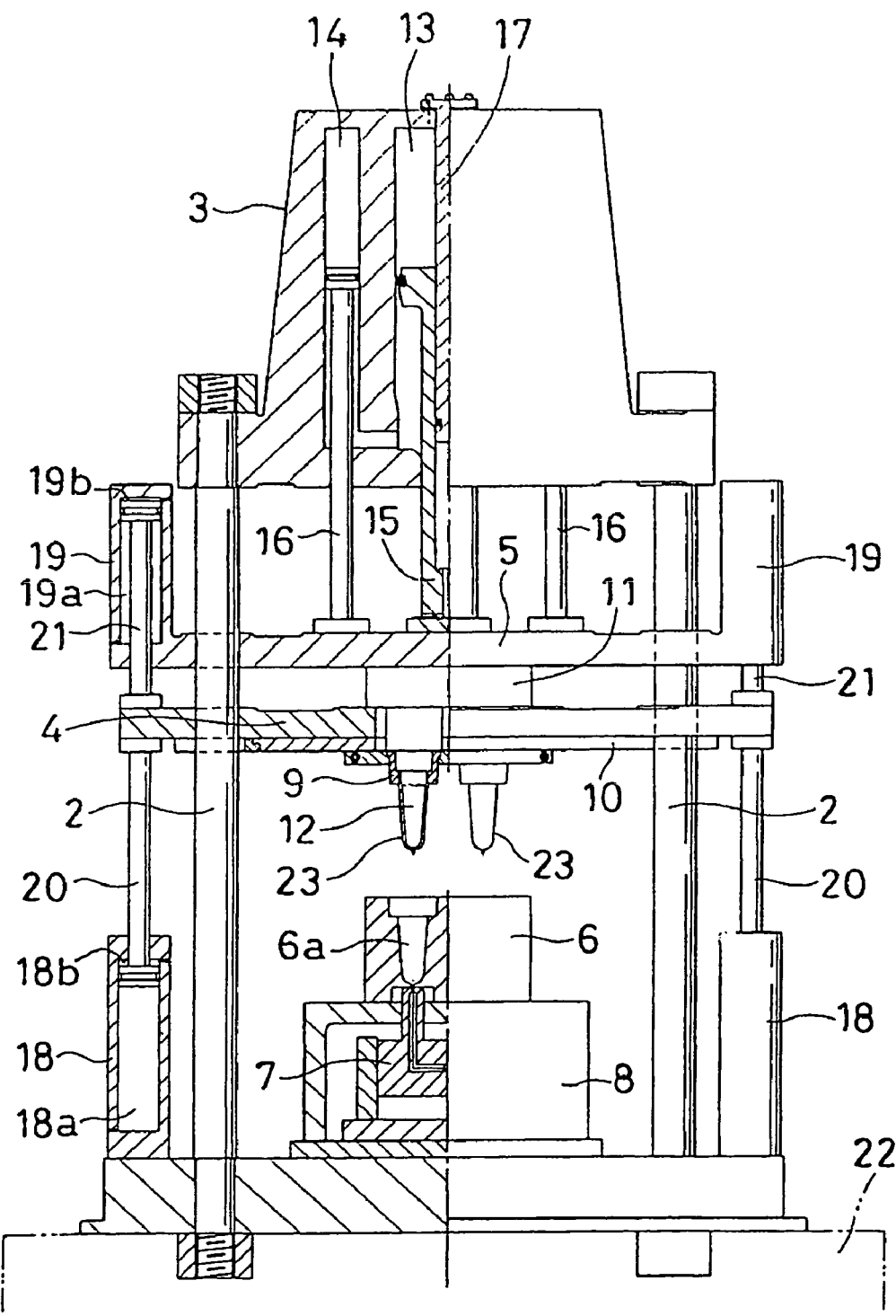
FIG. 2 is a left half vertical sectional view in elevation, of the clamping device of the present invention at the time of releasing a preform from the injection cavity.

When the upper base plate 4 and the movable plate 5 simultaneously move, the neck mold 9 which has been closing the upper opening of the injection cavity mold 6 moves up together with the injection core 12 and opening of the mold is performed. Then the preform 23 gets away from the cavity 6a while clinging to the injection core 12 as shown in FIG. 2 and is released from the injection cavity mold 6 while it is warm.

Figure 3:
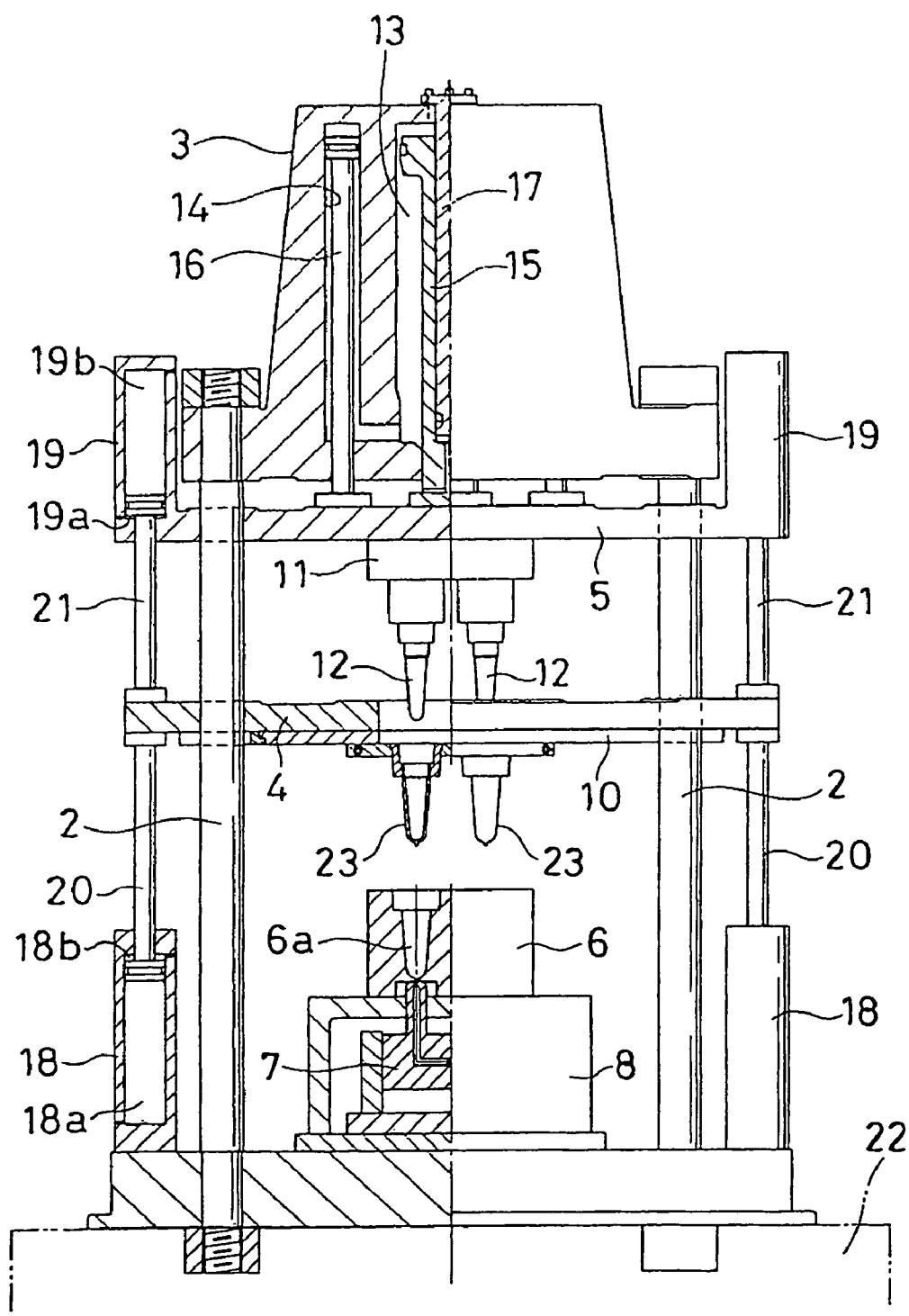
FIG. 3 is a left half vertical sectional view in elevation, of the clamping device of the present invention at the time of releasing an injection core.

When hydraulically blocking the lower chamber 18a and supplying the pressurized oil to the upper chamber 19b of the upward moving cylinder 19 after the piston rod 20 extends up to a set position, the cylinder side moves up together with the movable plate 5 while discharging air from the lower chamber 19a and the piston rod 21 extends, and as shown in FIG. 3, the injection core 12 gets away from the preform 23 and the injection core 12 is released.

Thereby, the preform 23 is stepwise released from the injection cavity mold 6 and the injection core 12. Moreover, the inside of the preform 23 is cooled until the preform 23 is released from the injection core 12. After the open of the mold, the preform 23 is moved to a not shown blow position in accordance with the rotation of the turntable 10 and another neck mold 9 is transferred onto the injection cavity mold 6.

By opening the lower chamber 18a of the vertical moving cylinder 18 to remove the oil-pressure resistance and supplying the pressurized oil to the upper chamber 18b after the turntable 10 stops, the piston rod 20 contracts, and the upper base plate 4 moves down together with the movable plate 5, which is connected by the piston rod 21. Then, the neck mold 9 is closed. In this case, the clamping ram 15 is also pulled downward by the movable plate 5 and extends. Further, almost all of the pressurized oil in the lower chamber flows to the upper chamber through the clearance around the piston, and, at the same time, the pressurized oil is replenished from the charge cylinder 14 and the negative pressure is prevented.

By hydraulically blocking the upper chamber 18b and fixing the upper base plate 4 to the injection cavity mold 6 after closing the neck mold 9 and then, opening the lower chamber 19a of the upward moving cylinder 19 and pressurizing the longitudinal clamping cylinder 13 by the pressurized oil supplied from a not shown hydraulic circuit, the clamping ram 15 moves down at a high speed due to a differential pressure. Thereby, the cylinder side of the upward moving cylinder 19 moves down together with the movable plate 5 and the piston rod 21 fixed to the upper base plate 4 contracts. The downward movement continues until the clamping plate 11 contacts with the upper surface of the upper base plate 4. After penetrating the hole portion bored on the upper base plate 4 and the turntable 10 as well as the neck mold 9, the injection core 12 is inserted into the cavity 6a and the whole is brought into closing state of the mold. Following the closing of the mold, the longitudinal clamping cylinder 13 becomes a powerful mold clamping state and the step is shifted to the injection and filling of the resin from the hot runner block 7 to the cavity 6a.

In the case of the above opening and closing operations, the injection cavity mold 6 and the neck mold 9 are previously opened to release the injection molded preform 23 from the cavity 6a and then the injection core 12 is released from the preform 23. Therefore, it is possible to cool the preform 23 from the inside of it until the injection core 12 is released after the preform 23 is released from the cavity 6a.

However, it is also possible to extend the upward moving cylinder 19 of the movable plate 5 at first and then extend the vertically moving cylinder 18 of the upper base plate 4 to release the injection core 12 first and release the preform 23 next. Moreover, it is also possible to release the preform 23 and open the injection core 12 at the same time to shorten the molding cycle. Thus, the above sequence is not restricted. The operation sequence can be optionally selected in accordance with the resin to be used as a molding material such as polyethylene terephthalate, polycarbonate, polypropylene, and polyethylene and it is possible to blow-mold or stretch blow-mold a good product by cooling the preform 23 to a temperature suitable for these molding materials and configuration or wall-thickness distribution of a hollow molded article.

What is claimed is:

1. A clamping device for an injection blow molding or an injection stretch blow molding machine comprising a lower base plate with an injection cavity mold set on its upper surface, a cylinder block for clamping connected to upper ends of tie bars stood on both sides of said lower base plate, an upper base plate vertically movably set above said lower base plate guided by the tie bars to rotatably hold a turntable of a neck mold below said upper base plate, a movable plate vertically movably set on said upper base plate guided the tie bars and connected with a clamping ram at the center of its upper surface, and an injection core inserted into a cavity of the injection cavity mold through said upper base plate, turntable, and neck nold, said injection core being and attached to the under face of said movable plate, wherein an upper-base-plate vertically moving cylinder and a movable-plate upward moving cylinder are disposed at both ends of said lower base plate and movable plate respectively so as to be vertically faced with each other and both piston rods of the respective cylinders are connected to said upper base plate.

* * * * *

UNITED STATES PATENT AND TRADEMARK OFFICE
CERTIFICATE OF CORRECTION

| | | |
|---|---|---|
| PATENT NO. | : 7,001,172 B2 | Page 1 of 1 |
| APPLICATION NO. | : 10/674804 | |
| DATED | : February 21, 2006 | |
| INVENTOR(S) | : Hideaki Koda | |

It is certified that error appears in the above-identified patent and that said Letters Patent is hereby corrected as shown below:

Column 4, claim 1, line 66, "neck nold" should read --neck mold--;

Column 4, claim 1, line 66, "being and" should read --being--; and

Column 6, claim 1, line 1, "respective cylinders" should read --respective moving cylinders--.

Signed and Sealed this

Twenty-eighth Day of November, 2006

JON W. DUDAS
*Director of the United States Patent and Trademark Office*